United States Patent Office 3,133,943
Patented May 19, 1964

3,133,943
COMPLEX GROUP VIII METAL HYDRIDES
Joseph Chatt, St. Albans, Roy Graham Hayter, Welwyn, and Frank Alan Hart, Welwyn Garden City, England, assignors to Imperial Chemical Industries Limited, London, England, a corporation of Great Britain
No Drawing. Filed Feb. 15, 1960, Ser. No. 8,530
Claims priority, application Great Britain Feb. 27, 1959
19 Claims. (Cl. 260—429)

This invention relates to new complex compounds which are ligand stabilised transition metal compounds.

We have found that molecules of transition metal hydrides, halohydrides, alkylhydrides, arylhydrides or thiocyanatohydrides, which may have no stable independent existence, and molecules of ligands as hereinafter specified may exist in combination as stable complex compounds. A complex compound of this kind has many of the properties which the corresponding free metal compound would be expected to have; and therefore the formation of such a complex compound provides a method of effectively stabilising the metal hydride, halohydride, alkylhydride, arylhydride or thiocyanatohydride respectively.

According to the present invention there are provided new complex compounds each of which comprises two constituents, namely a transition metal hydride, halohydride, alkylhydride, arylhydride or thiocyanatohydride and a constituent having the structure

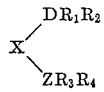

in which X is a divalent hydrocarbon radical, D and Z are atoms of elements belonging to group Va of the periodic table, and $R_1$, $R_2$, $R_3$ and $R_4$ are univalent hydrocarbon radicals.

Particularly suitable transition metals are those belonging to group VIII of the periodic table, such as for example iron, ruthenium, rhodium and osmium.

The halohydride may be, for example, a chlorohydride, a bromohydride or an iodohydride.

The alkyl group in the alkylhydride may conveniently be a lower alkyl group, such as for example methyl, ethyl or n-propyl. The aryl group in the arylhydride may be, for example, a phenyl group.

D and Z may be attached to the same or different carbon atoms in the radical X; but it is preferred that the chain length between the atoms D and Z should be at most 3 carbon atoms.

X may conveniently be a lower alkylene or arylene radical, such as for example methylene, ethylene or o-phenylene.

D and Z are preferably nitrogen, phosphorus or arsenic, phosphorus and arsenic being the elements which are most preferred. Although D and Z may conveniently be identical, they need not be so: for example D and Z may be phosphorus and arsenic respectively.

$R_1$, $R_2$, $R_3$ and $R_4$ may conveniently be lower alkyl or aryl radicals, such as for example, methyl, ethyl or phenyl. Although they may all be different, it is preferred that $R_1$ and $R_2$ be respectively identical to $R_3$ and $R_4$; and more preferably $R_1$, $R_2$, $R_3$ and $R_4$ should all be identical.

A number of typical examples of compounds as hereinbefore defined are shown in the table below.

It will be appreciated that in this specification the term "hydride" is intended to include a deuteride; and Examples 1 and 12 illustrate the preparation of deuterides according to the invention—namely di-(o-phenylene-bis-diethylphosphine) dideutero iron and di-(ethylene-bis-diethylphosphine) iron chlorodeuteride respectively.

The general formula of compounds according to the present invention may be written as

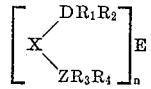

in which E is a transition metal hydride, halohydride, alkylhydride, arylhydride or thiocyanatohydride, X, D, Z, $R_1$, $R_2$, $R_3$ and $R_4$ are as hereinbefore defined, and $n$ depends on the nature of the transition metal. For example when the transition metal is iron, ruthenium or osmium, it is believed that $n$ is 2 and that E is FeHA, RuHA or OsHA respectively, A being a hydrogen or halogen atom or an alkyl, aryl or thiocyanate radical; whereas when the transition metal is rhodium it is believed that $n$ is 3 and that E is $Rh_2HA$, A being as hereinbefore defined.

A complex hydride, halohydride, alkylhydride or arylhydride may conveniently be prepared by reducing an appropriate complex metal halide, alkylhalide or arylhalide with a metal hydride (such as for example lithium aluminium hydride) in solution, substantially in the absence of oxygen. For example di-(o-phenylene-bis-diethylphosphine) dihydro iron may be prepared by reduction of an o-phenylene-bis-diethylphosphine ferric chloride complex of formula

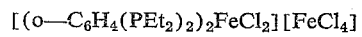

or the corresponding ferrous complex

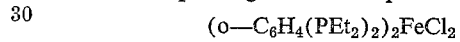

with lithium aluminium hydride in tetrahydrofuran; di-(ethylene-bis-diethylphosphine) ruthenium chlorohydride may be prepared by reduction of cis-di-(ethylene-bis-diethylphosphine) ruthenium dichloride with lithium aluminium hydride in tetrahydrofuran; di-(ethylene-bis-diphenylphosphine) ruthenium methylhydride may be prepared by reduction of di-(ethylene-bis-diphenylphosphine) ruthenium methyl chloride with lithium aluminium hydride in tetrahydrofuran; and di-(ethylene-bis-dimethylphosphine) ruthenium phenylhydride may be prepared by reduction of di-(ethylene-bis-dimethylphosphine) ruthenium phenylchloride with lithium aluminium hydride in tetrahydrofuran.

The product obtained by the process may readily be isolated and purified by removing solvent from the reaction mixture, extracting the product with a suitable solvent and recrystallising.

The process may conveniently be effected at room temperature.

Whereas in theory a complex thiocyanatohydride may be produced by reduction of a corresponding thiocyanatohalide, by a process analogous to that described above, in practice such a reaction is not found to be very convenient. Therefore it is preferred that a thiocyanatohydride be prepared by reacting in solution, substantially in the absence of oxygen, a corresponding halohydride and a thiocyanate (such as for example potassium thiocyanate), whereby the thiocyanatohydride is formed.

A ligand stabilised metal hydride according to the present invention may also be prepared by heating, substantially in the absence of oxygen, and in an atmosphere of hydrogen, the appropriate metal in finely divided form and a compound of formula

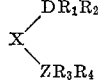

in which X, D, Z, $R_1$, $R_2$, $R_3$ and $R_4$ are as hereinbefore defined. For example di-(o-phenylene-bis-diethylphosphine) dihydro iron may be prepared by heating very finely divided metallic iron powder with o-phenylene-bisdiethylphosphine in the presence of hydrogen, a reaction temperature of about 200° C. being convenient.

In this direct method of preparation of complex hydrides the yield is improved if a small quantity of mercury is present in the reaction mixture. It is believed that this improvement can be accounted for by inhibition by the mercury of hydrogenation of the ligand. The quantity of mercury required is not critical; it is preferred to use such an amount, however, that liquid mercury is present in the reaction mixture. Other substances, such as for example lead or arsenic may be used; but mercury has the advantage that, being a liquid, it becomes well distributed over the surface of the powdered metal.

Compounds of the present invention are useful as catalysts, such as for example oxidation catalysts. For instance they effectively catalyse the oxidation of cyclohexene to cyclohexenone. They also find useful applications as reducing agents for effecting reduction of, for example, organic halides. For instance, dihydro complexes according to the invention rapidly reduce carbon tetrachloride at room temperature to chloroform.

In connection with their applications as catalysts and reducing agents the new complexes have the useful feature that they are generally soluble in organic solvents.

The following examples illustrate the preparation of compounds according to the present invention.

Examples 1, 2 and 6 describe the preparation of ligand stabilised metal hydrides from metals, ligands and hydrogen; Examples 3 to 5, 7 to 10 and 12 to 14 describe the preparation of ligand stabilised metal hydrides and halohydrides by reduction of appropriate halo-complexes with lithium aluminium hydride; Example 11 describes the preparation of ligand stabilised metal alkylhydrides by reduction of corresponding alkylhalo complexes with lithium aluminium hydride; Example 15 describes the preparation of ligand stabilised thiocyanatohydrides by reaction between corresponding halohydrides and thiocyanates; and Example 16 describes the preparation of a ligand stabilised metal arylhydride by reduction of a corresponding arylhalo complex with lithium aluminium hydride.

In the table given below will be found data relating to compounds prepared as described in the examples. These data consist of melting points determined in vacuo, observed and calculated quantitative analysis figures for carbon, hydrogen and (where appropriate) nitrogen, and wave numbers of infra-red spectra bands attributable to the stretching mode of vibration of metal-hydrogen bonds.

It is believed that all the compounds according to the invention which are prepared by the methods described in the following examples are predominantly of trans configuration. Evidence for this belief was obtained from diploe moment measurements.

EXAMPLE 1

0.95 gm. of ferrous oxalate dihydrate was heated in a test tube. The metallic iron powder produced was cooled. 1.17 gm. of o-phenylene-bis-diethylphosphine were added and the resulting mixture was heated on an oil bath at 200° C., the test tube, which was continuously shaken, being connected to a hydrogen bypass. After 28 hours the mixture was cooled and then transferred to a nitrogen-filled dry box. The solid product was washed with 5 ml. of acetone and then extracted with 4 ml. of benzene. The filtered benzene solution was allowed to evaporate in a stream of nitrogen. The resulting orange solid was washed with acetone, giving a yield of 0.07 gm. of $(o-C_6H_4(PEt_2)_2)_2FeH_2$, which was recrystallised from petrol of boiling range 40° C. to 60° C. in an atmosphere of nitrogen.

The deuteride corresponding to the above hydride was prepared by a similar method.

EXAMPLE 2

0.839 gm. of o-phenylene-bis-diethylphosphine and 0.50 gm. of rhodium black were heated in a flask to 200° C. for 17 hours in an atmosphere of hydrogen. The metal and diphosphine formed a thin layer on the flat bottom of the reaction flask. After the reaction the product was transferred to a nitrogen-filled dry box, and dissolved in a mixture of 10 ml. of acetone and 5 ml. of benzene. The resulting solution was filtered from unused rhodium. The filtrate was boiled down to one third of its original volume and petrol was carefully added. An orange crystalline substance was produced, and this was taken up in 10 ml. of hot methyl ethyl ketone. The resulting solution was cooled and petrol of boiling range 60° C. to 80° C. was carefully added.

Analysis indicated that the precipitate was $$(o-C_6H_4(PEt_2)_2)_3Rh_2H_2$$

The product was a good conductor of electricity in acetone solution, and may perhaps be formulated as the salt $[Rh\ dp_2]^-[dp\ RhH_2]^+$, where $dp$ is $o-C_6H_4(PEt_2)_2$.

EXAMPLE 3

Cis-$(C_2H_4(PEt_2)_2)_2RuCl_2$ was prepared in almost quantitative yield by heating either $((PPh_2Et)_3RuCl_2)_2$ or $((PPhEt_2)_3RuCl_2)_2$ with two molar equivalents of $C_2H_4(PEt_2)_2$ at 150° C. under nitrogen and in the absence of solvent. The complex was obtained as lemon yellow plates of melting point 214.5–215° C. by crystallisation from benzene-petrol mixtures. Analysis of the product indicated 40.90% C and 8.06% H, as compared with figures of 41.10% C and 8.28% H calculated for a compound of formula $C_{20}H_{48}P_4Cl_2Ru$. By using $$C_2H_4(PMe_2)_2$$

cis-$(C_2H_4(PMe_2)_2)_2RuCl_2$ was similarly prepared.

The corresponding bromide and iodide complexes were prepared from aqueous solutions of cis-$(C_2H_4(PEt_2)_2)_2RuCl_2$ and cis-$(C_2H_4(PMe_2)_2)_2RuCl_2$ by precipitation with an excess of aqueous alkali metal halide. All the cis-dihalide complexes were then reduced by the technique described below.

0.2 gm. of cis-$(C_2H_4(PEt_2)_2)_2RuCl_2$ was dissolved in 5 ml. of dry tetrahydrofuran, and a solution of lithium aluminium hydride in tetrahydrofuran was added dropwise under nitrogen until the yellow solution became colourless. Just sufficient alcohol was added to destroy the excess lithium aluminium hydride, and the solvent was then removed in vacuo. The white solid remaining was extracted with petrol of boiling range 60° C. to 80° C. and the extract gave 0.15 gm. of $C_2H_4(PEt_2)_2)_2RuHCl$ as colourless needles.

In a similar manner the corresponding complex containing methyl instead of ethyl groups, and also the corresponding bromide and iodide complexes, were prepared.

EXAMPLE 4

$(o-C_6H_4(PEt_2)_2)_2RuHCl$ and $(o-C_6H_4(PEt_2)_2)_2RuHI$ were prepared by similar methods to that described in Example 3.

EXAMPLE 5

$(o-C_6H_4(AsMe_2)_2)_2RuHCl$ was prepared by a similar method to that described in Example 3.

EXAMPLE 6

A mixture of 3.1 gm. of $o-C_6H_4(PEt_2)_2$, 3.1 gm. of iron powder (prepared as described in Example 1) and 3 ml. of mercury was stirred in a hydrogen atmosphere at 180° C. for 112 hours. After cooling the mixture was transferred to a nitrogen-filled dry box, extracted with 20 ml. of petrol of boiling range 80° C. to 100° C., in the presence of charcoal. 0.79 gm. of $(o-C_6H_4(PEt_2)_2)_2FeH_2$ was obtained, which was found to be identical to the product obtained in Example 1.

EXAMPLE 7

By heating $((PPhEt_2)_3OsCl_2)_2$ with four molar equivalents of $C_2H_4(PPh_2)_2$ at 250° C. under nitrogen, a mixture of cis- and trans-$(C_2H_4(PPh_2)_2)_2OsCl_2$ in a mole ratio of approximately 1:3 was obtained. The trans isomer was insoluble in tetrahydrofuran and was separated from the soluble cis form, which, after recrystallisation from benzene, was obtained as pale yellow prisms which melted, with decomposition, at 290° C. to 291° C. Analysis of the product indicated 59.0% C and 5.0% H as compared with figures of 59.0% C and 4.6% H calculated for a compound of formula $C_{52}H_{48}P_4Cl_2Os$.

Cis-$(C_2H_4(PPh_2)_2)_2OsCl_2$ in solution in tetrahydrofuran was reduced by $LiAlH_4$ by a method similar to that described in Example 3, except that the product was extracted from the solid residue into benzene. It was purified by crystallisation from petrol containing 25% benzene, and was obtained as pale yellow plates. Analysis of the product indicated the formula $$(C_2H_4(PPh_2)_2)_2OsHCl.C_6H_6$$

EXAMPLE 8

$(C_2H_4(PEt_2)_2)_2OsHCl$, $(C_2H_4(PEt_2)_2)_2OsHI$ and $$(C_2H_4(PMe_2)_2)_2OsHCl$$

were prepared from $((PPh_2Et)_3OsCl_2)_2$ and the corresponding diphosphines by methods similar to that described in Example 3.

EXAMPLE 9

Cis-$(CH_2(PPh_2)_2)_2OsCl_2$ was prepared from $$((PPh_2Et)_3OsCl_2)_2 \text{ and } CH_2(PPh_2)_2$$

by a method similar to that described for $$\text{cis-}(C_2H_4(PEt_2)_2)_2RuCl_2$$

in Example 3. It was obtained as pale yellow feathery needles (not melting below 350° C.) by addition of methanol to a warm solution of it in nitrobenzene. Analysis indicated 58.2% C and 4.45% H compared with 58.3% C and 4.3% H calculated for a compound of formula $C_{50}H_{44}P_4Cl_2Os$.

Cis-$(CH_2(PPh_2)_2)_2OsCl_2$ was reduced by a method similar to that described in Example 3. After extraction into benzene, the product was purified by recrystallisation from a mixture of equal volumes of benzene and petrol, and was obtained in 85% yield as pale yellow needles. Analysis of the product indicated the formula $$(CH_2(PPh_2)_2)_2OsHCl.C_6H_6$$

EXAMPLE 10

$(CH_2(PPh_2)_2)_2RuHCl.\frac{1}{2}C_6H_6$ was prepared by a method similar to that described in Example 9.

EXAMPLE 11

0.30 gm. of $(C_2H_4(PPh_2)_2)_2RuMeCl$ prepared as described in our co-pending application Serial No. 7,975 filed February 11, 1960 and issued as U.S. Patent No. 3,084,179 on April 2, 1963 was dissolved in 10 ml. of dry tetrahydrofuran, and an excess of a solution of $LiAlH_4$ in tetrahydrofuran was added under nitrogen, causing a fading in colour to pale yellow. The excess $LiAlH_4$ was destroyed with alcohol, and the solvent was then removed in vacuo. Extraction of the residual solid with benzene gave 0.19 gm. of $(C_2H_4(PPh_2)_2)_2RuHMe$, which was obtained as colourless crystals after crystallisation from benzene-petrol mixtures.

$(C_2H_4(PPh_2)_2)_2RuHEt$ and $$(C_2H_4(PPh_2)_2)_2RuHPr^n.C_6H_6$$

were prepared by methods similar to that described above.

EXAMPLE 12

0.465 gm. of $FeCl_2.4H_2O$ was dried in a Dean and Stark apparatus with refluxing benzene for 16 hours. 0.96 gm. of $C_2H_4(PEt_2)_2$ was then added and the refluxing was continued for a further hour, after which time only a trace of a white solid remained in the dark green solution. The solvent was removed at a pressure of 12 mm. Hg, and the resulting dark green residue was extracted with petrol, leaving some red oil. On cooling the filtrate deposited bright green crystals, which, on recrystallisation from petrol, afforded 0.90 gm. of pure $$\text{trans-}(C_2H_4(PEt_2)_2)_2FeCl_2$$

corresponding to a yield of 72%. Analysis indicated 44.3% C and 9.1% H as compared with the figures of 44.55% C and 9.0% H calculated for a compound of formula $C_{20}H_{48}P_4Cl_2Fe$.

0.50 gm. of trans-$(C_2H_4(PEt_2)_2)_2FeCl_2$ in 15 ml. of tetrahydrofuran was treated dropwise with a solution of $LiAlH_4$ in tetrahydrofuran. An intense red solution was first obtained, which faded to pale yellow on addition of more $LiAlH_4$. Alcohol was added until effervescence ceased, the red colour being restored. After removal of solvent in a stream of nitrogen, the residual oil was extracted with hot petrol. On cooling the extract deposited red crystals, which, on recrystallisation from petrol, afforded 0.30 gm. of pure $(C_2H_4(PEt_2)_2)_2FeHCl$, corresponding to a yield of 64%.

This hydride could also be prepared, in lower yield, from the red solution first obtained, before the alcohol treatment. By this latter method, using $LiAlD_4$ instead of $LiAlH_4$, the corresponding complex deuteride $$(C_2H_4(PEt_2)_2)_2FeDCl$$

was obtained.

(o-$C_6H_4(PEt_2)_2)_2FeHCl$ was prepared in 70% yield by a method similar to that described in the second paragraph of this example.

EXAMPLE 13

$[(\text{o-}C_6H_4(PEt_2)_2)_2FeCl_2][FeCl_4]$ was prepared by adding 0.475 gm. of o-$C_6H_4(PEt_2)_2$ in benzene to a solution of 0.29 gm. of ferric chloride in ethanol. A dark green precipitate was formed, which on crystallisation from acetone afforded the pure complex as dark green rods which melted, with decomposition, at 150° C. to 165° C. Analysis of the product indicated 40.2% C and 5.85% H as compared with 40.4% C and 5.8% H calculated for a compound of formula $C_{28}H_{48}P_4Cl_6Fe_2$. The molar conductivity in nitrobenzene and the molecular weight in acetone indicated that this compound behaves as a univalent electrolyte in these solvents.

(o-$C_6H_4(PEt_2)_2)_2FeCl_2$ was prepared by a method similar to that described in the first paragraph of Example 12. Analysis of the product indicated 52.7% C and 7.6% H as compared with 52.9% C and 7.6% H calculated for a compound of formula $C_{28}H_{48}P_4Cl_2Fe$.

Reduction of either $[(\text{o-}C_6H_4(PEt_2)_2)_2FeCl_2][FeCl_4]$ or (o-$C_6H_4(PEt_2)_2)_2FeCl_2$ by a method similar to that described in the second paragraph of Example 12, except that the treatment with alcohol was omitted, gave (o-$C_6H_4(PEt_2)_2)_2FeH_2$ in a yield of 5% and 40% respectively. The product was identical to that prepared according to the method described in Example 1.

EXAMPLE 14

$(C_2H_4(PEt_2)_2)_2RuH_2$ was prepared in 60% yield by reduction of $(C_2H_4(PEt_2)_2)_2RuHCl$ (prepared as described in Example 3) by a method similar to that described in the third paragraph of Example 3, except that the treatment with alcohol was omitted.

EXAMPLE 15

0.10 gm. of $(C_2H_4(PEt_2)_2)_2RuHCl$ (prepared as described in Example 3) in 5 ml. of acetone was treated with a solution of 0.20 gm. of potassium thiocyanate in 4 ml. of acetone under nitrogen. A white precipitate appeared immediately, and, after warming for 5 minutes on a water bath, the solution was filtered and the solvent was removed under reduced pressure. The benzene soluble portion of the resulting pale yellow residue was crystallised from petrol, and 0.036 gm. of the pure compound $(C_2H_4(PEt_2)_2)_2RuHSCN$ was obtained as colourless needles.

$(C_2H_4(PEt_2)_2)_2OsHSCN$ was prepared by a similar method.

EXAMPLE 16

$(C_2H_4(PMe_2)_2)_2RuHPh$ was prepared by reducing $(C_2H_4(PMe_2)_2)_2RuPhCl$ (prepared as described in copending application Serial No. 7,975, filed February 11, 1960, with lithium aluminium hydride by a method similar to that described in Example 14.

*Table*

| Compound | Example | Melting point in vacuo, °C. | Analysis | | | | | | Infra-red band attributed to metal-H stretching, wave number in cm.⁻¹ |
| | | | Calculated | | | Observed | | | |
| | | | Percent C | Percent H | Percent N | Percent C | Percent H | Percent N | |
| $(o\text{-}C_6H_4(PEt_2)_2)_2FeH_2$ | 1, 6, 13 | *248–252 | 59.4 | 8.9 | | 59.3 | 9.0 | | h 1,728 |
| $(o\text{-}C_6H_4(PEt_2)_2)_3Rh_2H_2$ | 2 | *360–363 | 51.9 | 7.7 | | 52.1 | 7.7 | | n 1,724 |
| $(C_2H_4(PEt_2)_2)_2RuH_2$ | 14 | 150–153 | 46.6 | 9.8 | | 46.4 | 9.7 | | b 1,613 |
| $(C_2H_4(PEt_2)_2)_2RuHCl$ | 3 | 174.5–176 | 43.67 | 8.98 | | 43.62 | 8.97 | | h 1,938 |
| $(C_2H_4(PEt_2)_2)_2RuHBr$ | 3 | 183–190 | 40.40 | 8.31 | | 39.86 | 8.26 | | b 1,945 |
| $(C_2H_4(PEt_2)_2)_2RuHI$ | 3 | *212.5–224 | 37.45 | 7.70 | | 37.47 | 7.66 | | h 1,948 |
| $(C_2H_4(PMe_2)_2)_2RuHCl$ | 3 | *212–237 | 32.92 | 7.60 | | 32.42 | 7.40 | | h 1,891 |
| $(C_2H_4(PMe_2)_2)_2RuHBr$ | 3 | *290–299 | 29.88 | 6.90 | | 29.69 | 6.88 | | h 1,895 |
| $(C_2H_4(PMe_2)_2)_2RuHI$ | 3 | *322 | 27.23 | 6.28 | | 27.31 | 6.23 | | h 1,898 |
| $(o\text{-}C_6H_4(PEt_2)_2)_2RuHCl$ | 4 | *250–256 | 52.05 | 7.6 | | 51.8 | 7.6 | | b 1,978 |
| $(o\text{-}C_6H_4(PEt_2)_2)_2RuHI$ | 4 | 278–283* | 45.6 | 6.7 | | 45.5 | 6.7 | | b 1,976 |
| $(o\text{-}C_6H_4(AsMe_2)_2)_2RuHCl$ | 5 | Too unstable to be crystallised | | | | Not analysed | | | h 1,084 |
| $(C_2H_4(PPh_2)_2)_2OsHCl.C_6H_6$ | 7 | *313.5–318 | 63.2 | 5.0 | | 63.1 | 5.2 | | n 2,046 |
| $(C_2H_4(PEt_2)_2)_2OsHCl$ | 8 | *170.5–171.5 | 37.6 | 7.7 | | 37.95 | 7.7 | | h 2,039 |
| $(C_2H_4(PEt_2)_2)_2OsHI$ | 8 | *224–231 | 32.9 | 6.8 | | 32.8 | 6.8 | | h 2,051 |
| $(C_2H_4(PMe_2)_2)_2OsHCl$ | 8 | *190–205 | 27.35 | 6.3 | | 27.1 | 6.3 | | n 2,014 |
| $(CH_2(PPh_2)_2)_2OsHCl.C_6H_6$ | 9 | *296–300 | 62.6 | 4.8 | | 62.3 | 4.9 | | b 2,045 |
| $(CH_2(PPh_2)_2)_2RuHCl.½C_6H_6$ | 10 | *283–284.5 | 67.4 | 5.1 | | 67.5 | 5.4 | | n 1,977 |
| $(C_2H_4(PPh_2)_2)_2RuHMe$ | 11 | *247–251.5 | 69.65 | 5.74 | | 69.96 | 5.74 | | b 1,884 |
| $(C_2H_4(PPh_2)_2)_2RuHEt$ | 11 | *289–294 | 69.89 | 5.87 | | 69.76 | 5.93 | | b 1,872 |
| $(C_2H_4(PPh_2)_2)_2RuHPr^n.C_6H_6$ | 11 | *278–280 | 71.82 | 6.13 | | 71.97 | 6.06 | | b 1,867 |
| $(C_2H_4(PEt_2)_2)_2FeHCl$ | 12 | *154.5–155 | 47.6 | 9.8 | | 47.1 | 9.6 | | n 1,849 |
| $(C_2H_4(PEt_2)_2)_2FeDCl$ | 12 | *154.5–155 | | | | | | | n 1,336(Fe-D) n 1,728 |
| $(o\text{-}C_6H_4(PEt_2)_2)_2FeHCl$ | 12 | *240–245 | 56.0 | 8.2 | | | | | |
| $(C_2H_4(PEt_2)_2)_2RuHSCN$ | 15 | *245–249 | 44.0 | 8.6 | 2.45 | 43.5 | 8.35 | 2.5 | h 1,919 |
| $(C_2H_4(PEt_2)_2)_2OsHSCN$ | 15 | *200–240 | 38.1 | 7.5 | 2.1 | 38.4 | 7.5 | 2.3 | h 2,009 |
| $(C_2H_4(PMe_2)_2)_2RuHPh$ | 16 | *159–161 | 45.1 | 8.0 | | 45.55 | 7.9 | | n 1,757 |

*Compounds melt with decomposition.   n Nujol mull.   h Hexane solution.   b Benzene solution.

We claim:
1. New complex compounds of the formula

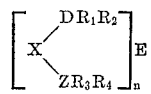

in which
E is a metal hydride having a formula selected from the group consisting of $Rh_2HA$ and $MHA$ in which M is a metal of group VIII of the periodic table and A is a member of the class consisting of hydrogen, halogen, alkyl, aryl and thiocyanate, X is a divalent hydrocarbon radical selected from the group consisting of lower alkylene and phenylene containing not more than 3 carbon atoms between the atoms D and Z, D and Z are atoms of elements belonging to group $V_a$ of the periodic table, $R_1$, $R_2$, $R_3$ and $R_4$ are selected from the group consisting of lower alkyl and aryl and $n$ is an integer not greater than three.

2. Compounds according to claim 1 in which the metal is iron.

3. Compounds according to claim 1 in which X is lower alkylene.

4. Compounds according to claim 1 in which at least one of D and Z is nitrogen.

5. Compounds according to claim 1 in which D and Z are identical.

6. Compounds according to claim 1 in which at least one of $R_1$, $R_2$, $R_3$ and $R_4$ is lower alkyl.

7. Compounds according to claim 1 in which $R_1$ and $R_2$ are respectively identical to $R_3$ and $R_4$.

8. Compounds according to claim 1 in which $R_1$, $R_2$, $R_3$, and $R_4$ are all identical.

9. A compound according to claim 1 in which the metal is ruthenium.

10. A compound according to claim 1 in which the metal is rhodium.

11. A compound according to claim 1 in which the metal is osmium.

12. Compounds according to claim 1 in which X is phenylene.

13. Compounds according to claim 1 in which at least one of D and Z is phosphorus.

14. Compounds according to claim 1 in which at least one of D and Z is arsenic.

15. Compounds according to claim 1 in which at least one of $R_1$, $R_2$, $R_3$ and $R_4$ is monocyclic aryl.

16. A process for the production of the complex compounds of claim 1 which comprises reducing, with lithium aluminium hydride, in solution and substantially in the absence of oxygen, a complex compound of the formula

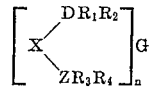

in which
G is a halide of a metal of group VIII of the periodic table,

X is a divalent hydrocarbon radical selected from the group consisting of lower alkylene and phenylene containing at most 3 carbon atoms between the atoms D and Z, D and Z are atoms of elements belonging to group $V_a$ of the periodic table, $R_1$, $R_2$, $R_3$ and $R_4$ are selected from the group consisting of lower alkyl and aryl and $n$ is an integer not greater than three.

17. A process for producing a complex thiocyanotohydride as set forth in claim 1 which comprises reacting, a thiocyanate, with a compound according to claim 1 in which A is a halogen atom, in solution, and substantially in the absence of oxygen.

18. A process for the production of the complex compounds of claim 1 which comprises heating, substantially in the absence of oxygen and in an atmosphere of hydrogen, a transition metal of group VIII of the periodic table, in finely divided form, and a compound of the formula

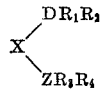

in which
- X is a divalent hydrocarbon radical selected from the group consisting of lower alkylene and phenylene containing at most 3 carbon atoms between the atoms D and Z,
- D and Z are atoms of the elements group $V_a$ of the periodic table and
- $R_1$, $R_2$, $R_3$ and $R_4$ are selected from the group consisting of lower alkyl and aryl.

19. A process according to claim 18 in which a small quantity of mercury is present in the reaction mixture.

References Cited in the file of this patent

UNITED STATES PATENTS

| | | |
|---|---|---|
| 2,922,819 | Chatt et al. | Jan. 26, 1960 |
| 2,946,821 | Schenck et al. | July 26, 1960 |

OTHER REFERENCES

Mann: "Chemistry and Industry," April 29, 1939, pages 401–403.

Nyholm et al.: "Journal of the Chemical Society (London)," February 1958, pages 560–572.

Gaylord: "Reduction With Complex Metal Hydrides," Interscience Publishers (1956), pages 42–43.